US008475653B2

(12) United States Patent
Kim et al.

(10) Patent No.: US 8,475,653 B2
(45) Date of Patent: Jul. 2, 2013

(54) WATER TREATMENT APPARATUS HAVING MESHED TUBES PROVIDED WITH CILIA AND WATER TREATMENT METHOD USING THE SAME

(75) Inventors: Kwang-Soo Kim, Goyang-si (KR); I-Tae Kim, Goyang-si (KR); Kwang-Ho Ahn, Goyang-si (KR); Jun-Ho Park, Goyang-si (KR); Yu-Jin Lee, Cheongju-si (KR)

(73) Assignees: Korea Institute of Construction Technology, Gyeonggi-do (KR); NASSTech. E&C Co., Ltd., Gyeonggi-do (KR); Keosung Construction Co., Ltd., Seoul (KR); Keosong Construction Co., Ltd., Gyeonggi-do (KR)

( * ) Notice: Subject to any disclaimer, the term of this patent is extended or adjusted under 35 U.S.C. 154(b) by 215 days.

(21) Appl. No.: 12/834,372

(22) Filed: Jul. 12, 2010

(65) Prior Publication Data
US 2011/0049033 A1    Mar. 3, 2011

(30) Foreign Application Priority Data
Sep. 3, 2009    (KR) ........................ 10-2009-0083185

(51) Int. Cl.
*C02F 3/06*    (2006.01)
*C02F 3/10*    (2006.01)

(52) U.S. Cl.
CPC . *C02F 3/06* (2013.01); *C02F 3/109* (2013.01); *Y10S 261/72* (2013.01)
USPC ..... 210/150; 210/618; 210/280; 261/DIG. 72

(58) Field of Classification Search
USPC ................ 210/150, 151, 280, 383, 388, 615, 210/617, 618, 785; 261/DIG. 72
See application file for complete search history.

(56) References Cited

U.S. PATENT DOCUMENTS 4,137,171 A * 1/1979 Yokata .......................... 210/150
4,289,630 A * 9/1981 Schmidt et al. ............... 210/785

(Continued)

FOREIGN PATENT DOCUMENTS

| JP | 1-111490 | * 4/1989 |
| JP | 01-164493 |  6/1989 |

(Continued)

OTHER PUBLICATIONS

Machine translation of JP 2007-237100, Sep. 2007.*

*Primary Examiner* — Christopher Upton
(74) *Attorney, Agent, or Firm* — IP & T Group LLP

(57) ABSTRACT

A water treatment apparatus includes a plurality of meshed tubes made of synthetic yarn and provided with cilia; a plurality of tube stack cages containing the meshed tubes; and an aeration diffuser positioned between the tube stack cages and configured to provide air so that to-be-treated influent water moves to the tube stack cages. The hollow interior of the filter media, i.e. meshed tubes, enables water to move in any direction, and the high porosity maximizes the area for filtering of suspended solids and attachment of microorganisms. The resulting efficiency of removal of suspended solids and soluble organic material is far greater than conventional methods. Arrangement of diffusers in the middle of the reaction tank and between the tube stack cages and aeration by them result in perfect mixing in the reaction tank. The load of suspended solids and soluble organic materials is evenly distributed over the entire filer media.

4 Claims, 4 Drawing Sheets

U.S. PATENT DOCUMENTS

| | | | | |
|---|---|---|---|---|
| 4,741,841 A * | 5/1988 | Borre et al. | | 210/388 |
| 4,810,377 A * | 3/1989 | Kato et al. | | 210/150 |
| 4,985,182 A * | 1/1991 | Basse et al. | | 210/150 |
| 5,202,027 A * | 4/1993 | Stuth | | 210/151 |
| 5,399,266 A * | 3/1995 | Hasegawa et al. | | 210/150 |
| 5,468,392 A * | 11/1995 | Hanson et al. | | 210/150 |
| 5,985,148 A * | 11/1999 | Liu | | 210/150 |
| 6,793,810 B1 * | 9/2004 | Takahashi | | 210/150 |
| 6,942,788 B1 * | 9/2005 | Cox et al. | | 210/151 |
| 2006/0138048 A1 * | 6/2006 | Hu et al. | | 210/150 |

FOREIGN PATENT DOCUMENTS

| | | |
|---|---|---|
| JP | 05-137906 | 6/1993 |
| JP | 2006-263605 | 10/2006 |
| JP | 2007-237100 | 9/2007 |

* cited by examiner

WATER TREATMENT APPARATUS HAVING MESHED TUBES PROVIDED WITH CILIA AND WATER TREATMENT METHOD USING THE SAME

CROSS-REFERENCE(S) TO RELATED APPLICATIONS

The present application claims priority of Korean Patent Application No. 10-2009-0083185 filed on Sep. 3, 2009, which is incorporated herein by reference in its entirety.

BACKGROUND OF THE INVENTION

The present invention relates to a water treatment apparatus having meshed tubes provided with cilia and a water treatment method using the same. More particularly, the present invention relates to a water treatment apparatus including a plurality of meshed tubes made of synthetic yarn and provided with cilia and a plurality of tube stack cages containing the meshed tubes, so that biologically treated sewage and wastewater, rainwater, etc. are treated by using the tubes and cages to remove low-concentration pollutants such as soluble organic materials and suspended solids, as well as a water treatment method using the same.

As generally known in the art, pollutants contained in sewage and wastewater include high-concentration soluble organic materials and suspended solids, which are commonly removed through activated sludge (biological treatment) and sediment processes until the concentration of soluble organic materials (in terms of biological oxygen demand or BOD) and suspended solids (SS) drops below about 20 mg/L. The treated water is then discharged to streams, rivers, etc.

In the case of water from nonpoint pollution sources, such as surface runoff from rainwater, the concentration of suspended solids is high, but that of soluble organic materials is very low. This means that the water can be discharged to streams and rivers without special treatment.

There has been a worldwide consensus that removal of pollutants from sewage and wastewater suffices to prevent pollution of rivers and streams. However, such an approach has barely improved the water quality of streams and rivers. Therefore, it has recently been common to conduct further filtration after biological treatment and secondary sedimentation. It has also been mandatory to treat rainwater and remove pollutants before discharging it.

Conventional methods for removing low-concentration soluble organic materials and suspended solids include sand filtration, granulation of plastic or ceramic and its use as a carrier, and microfiltration using a synthetic membrane.

The sand filtration requires complicated underlying water collection facilities and operation systems, and occupies a large area of land, making it unpopular. Furthermore, it can only remove suspended solids (i.e. soluble organic materials are not removed).

The plastic or ceramic filtration has a problem in that, if the filter media are installed fixedly, suspended solids and soluble organic materials are removed only through pores between the media, and the resulting slime tends to clog the pores, even the channels. In an attempt to solve this problem, it has been proposed to employ movable filter media. However, collision between the media detaches microorganisms.

The microfiltration based on a synthetic membrane, which has recently been developed, relies on micropores to remove suspended solids, but it cannot remove soluble organic materials.

As mentioned above, conventional filter media have the following problem: pores between the media provide filtration space, and fluid can only flow in one direction through the pores, i.e. upward, downward, or laterally. As a result, hydraulic mixing in the reaction tank occurs in a plug flow type. This means that the load of pollutants is very high at the entrance, but gradually decreases toward the rear end, so that pores of the entrance, which is highly loaded, are easily clogged.

Therefore, it is necessary to minimize the clogging of filter media, which is the problem of conventional filter media, and to remove both suspended solids and soluble organic materials.

SUMMARY OF THE INVENTION

An embodiment of the present invention is directed to a water treatment apparatus having meshed tubes made of synthetic yarn and provided with cilia so that the combination of meshed exterior and hollow interior enables water to flow in any direction and creates no congested area. The pores between the meshed tubes are filled with their cilia and, together with the meshed surface, act as a sieve that removes suspended solids. Furthermore, the mesh and cilia of the filter media maximize the specific surface area, to which microorganisms can attach and remove soluble organic materials.

Another embodiment of the present invention is directed to a water treatment apparatus having meshed tubes and diffusers installed in the middle of the reaction tank along the direction of flow of influent polluted water, which flows in the middle of the reaction tank, so that aeration by the diffusers evenly distributes pollutants to filter media on both sides. This realizes virtually perfect hydraulic mixing. As a result, the load of pollutants is evenly distributed over the entire reaction tank. This solves the problem of conventional filter media, which are easily clogged by concentrated pollutant load on the front end of the reaction tank.

Another embodiment of the present invention is directed to a water treatment apparatus having meshed tubes provided with cilia and a water treatment method using the same, wherein the meshed tubes are used as filter media to maximize removal of suspended solids and soluble organic materials, and aeration evenly distributes pollutants to filter media on both sides so that virtually perfect hydraulic mixing is realized, thereby solving the problem of conventional filter media which otherwise would be clogged easily.

In accordance with an embodiment of the present invention, a water treatment apparatus includes a plurality of meshed tubes made of synthetic yarn and provided with cilia; a plurality of tube stack cages containing the meshed tubes; and an aeration diffuser positioned between the tube stack cages and configured to provide air so that to-be-treated influent water moves to the tube stack cages.

DESCRIPTION OF SPECIFIC EMBODIMENTS

Figure 1:
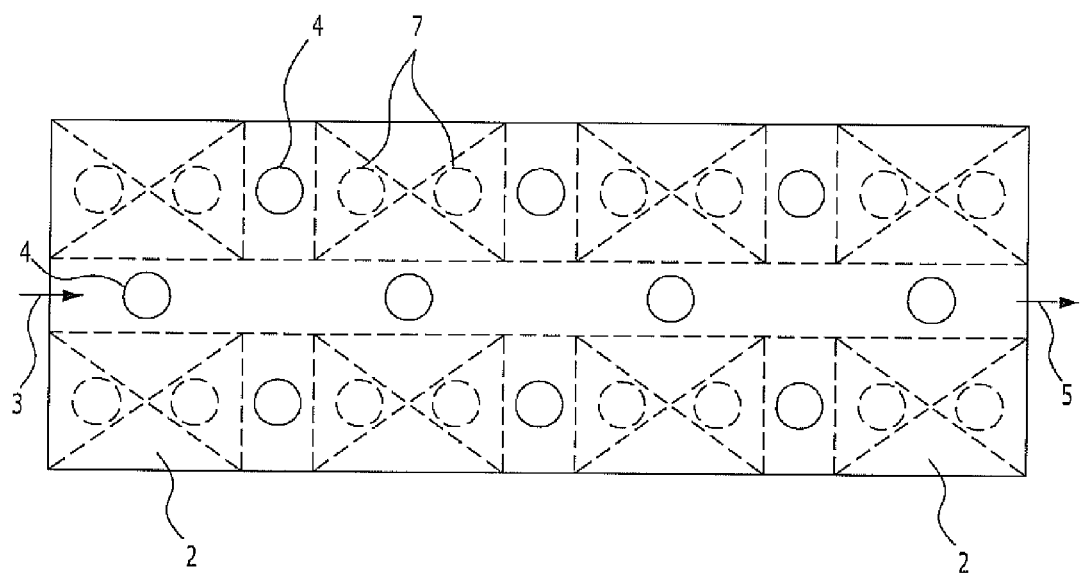
FIG. 1 is a diagrammatic top view of a water treatment apparatus having meshed tubes in accordance with the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

A water treatment apparatus in accordance with the present invention includes a plurality of meshed tubes made of synthetic yarn and provided with cilia; a plurality of tube stack cages containing the meshed tubes; and an aeration diffuser positioned between the tube stack cages and configured to provide air so that to-be-treated influent water moves to the tube stack cages.

The meshed tubes are obtained by selecting yarn from the group consisting of polypropylene yarn, polyethylene yarn, polyvinyl alcohol yarn, and acrylic yarn, the yarns having a thickness of about 0.1 mm, weaving the yarn into an elongated cylinder, and cutting the cylinder into tubes having a length of about 5 cm.

Ends of the meshed tubes are unwoven and provided with cilia.

The meshed tubes have a dimension selected from the group consisting of a caliber of 3 mm and a mesh size of 0.26 mm×0.25 mm, a caliber of 5 mm and a mesh size of 0.75 mm×0.85 mm, a caliber of 10 mm and a mesh size of 1.1 mm×1.4 mm, a caliber of 15 mm and a mesh size of 1.5 mm×1.8 mm, and a caliber of 20 mm and a mesh size of 1.8 mm×1.9 mm.

The water treatment apparatus further includes a treated water overflow weir positioned above the tube stack cages and configured to discharge treated water, suspended solids and soluble organic materials having been removed from the treated water.

The water treatment apparatus further includes a suspended solid discharge weir positioned above the tube stack cages and configured to discharge detached suspended solids.

The water treatment apparatus further includes springs coupled to the top of the tube stack cages and configured to cause vertical movements of the tube stack cages.

The water treatment apparatus further includes a suspended solid removal aeration diffuser positioned below the meshed tubes and configured to provide air so that suspended solids are removed from the meshed tubes.

Hereinafter, the construction, functionality, and advantages of a water treatment apparatus having meshed tubes and a water treatment apparatus using the same in accordance with an exemplary embodiment of the present invention will be described in detail.

Figure 2:
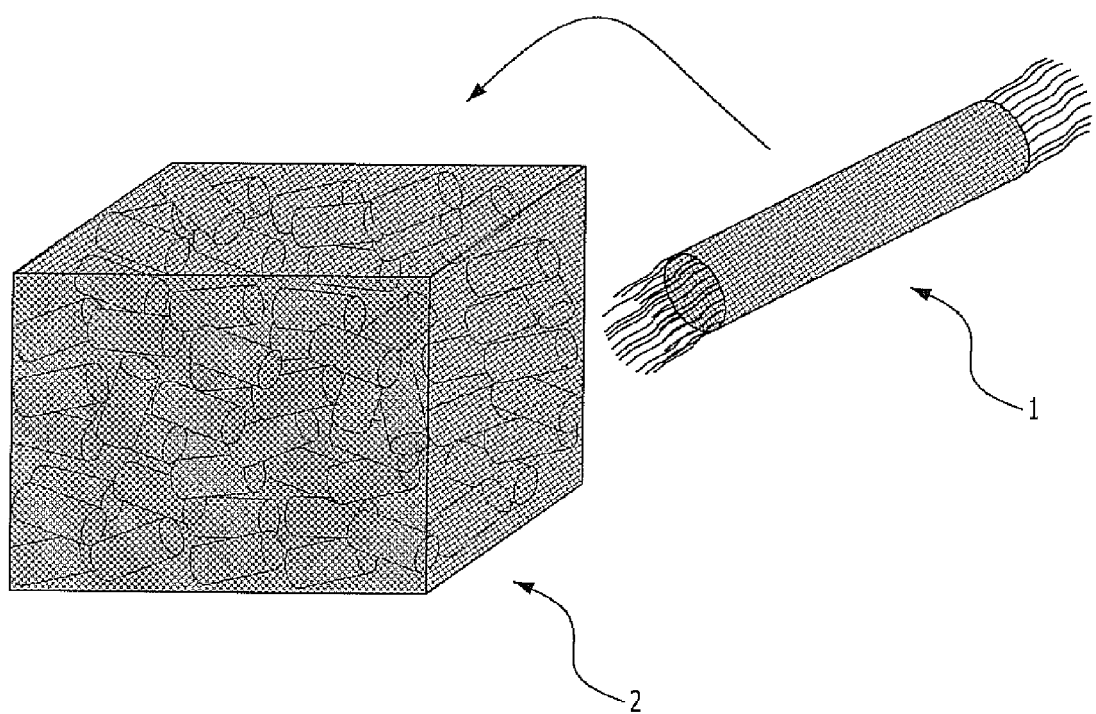
FIG. 2 is a diagrammatic perspective view of a tube stack cage and a meshed tube in accordance with the present invention.
Figure 3:
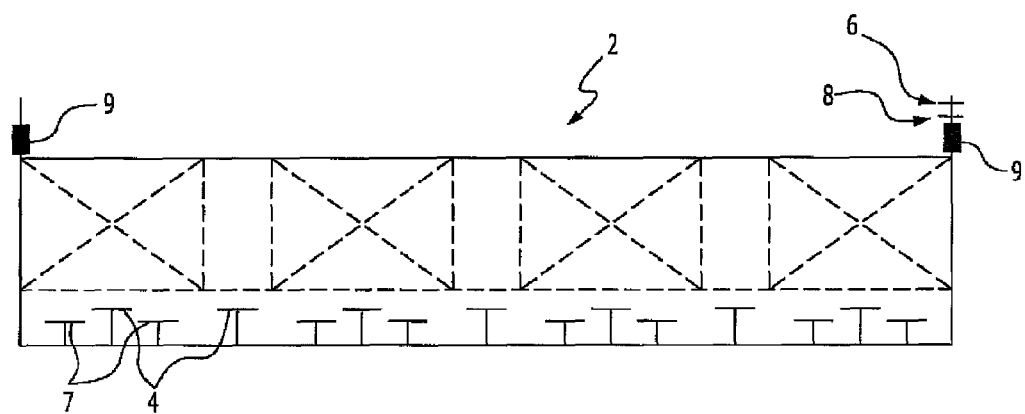
FIG. 3 is a diagrammatic lateral view of the water treatment apparatus having meshed tubes shown in FIG. 1.
Figure 4:
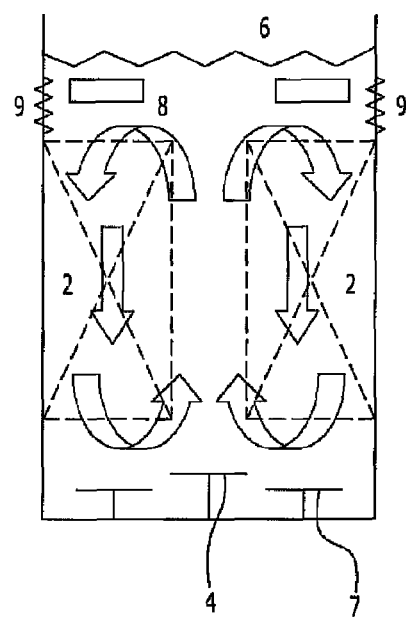
FIG. 4 is a diagrammatic front view of the water treatment apparatus having meshed tubes shown in FIG. 1.

FIG. 1 is a diagrammatic top view of a water treatment apparatus having meshed tubes in accordance with the present invention. FIG. 2 is a diagrammatic perspective view of a tube stack cage and a meshed tube in accordance with the present invention. FIG. 3 is a diagrammatic lateral view of the water treatment apparatus having meshed tubes shown in FIG. 1. FIG. 4 is a diagrammatic front view of the water treatment apparatus having meshed tubes shown in FIG. 1.

Referring to the drawings, the water treatment apparatus includes meshed tubes 1, tube stack cages 2, aeration diffusers 4, a treated water overflow weir 6, suspended solid removal aeration diffusers 7, a suspended solid discharge weir 8, and springs 9.

More specifically, the meshed tubes 1 are obtained by weaving yarn (e.g. polypropylene yarn, polyethylene yarn, polyvinyl alcohol yarn, acrylic yarn) having a thickness of about 0.1 mm into an elongated cylinder, and cutting the cylinder into tubes having a length of about 5 cm. The resulting meshed tubes 1 are put into a tank, and an excessive amount of air is blown so that collision and friction between the tubes unweave their end portions, which are naturally provided with cilia, while other portions remain in the meshed shape.

The dimension of the meshed tubes 1 can be variously determined based on design requirements, and may be selected from the following examples: a caliber of 3 mm and a mesh size of 0.26 mm×0.25 mm, a caliber of 5 mm and a mesh size of 0.75 mm×0.85 mm, a caliber of 10 mm and a mesh size of 1.1 mm×1.4 mm, a caliber of 15 mm and a mesh size of 1.5 mm×1.8 mm, and a caliber of 20 mm and a mesh size of 1.8 mm×1.9 mm. The caliber increases/decreases in proportion to the mesh size. Specifically, tubes having a caliber or 3 mm or 5 mm may be used to filter suspended solids having a size of 1-10 μm or less, and tubes having a caliber of 10 mm or larger may be used to filter suspended solids having a size of 10 μm or larger. A combination of different dimensions of tubes may also be used.

The meshed tubes are hollow, i.e. their porosity is at least 90%, which is substantially higher than that of conventional filter media (40-60%). Such a high porosity enables water to flow in any direction and creates no congested area. The area of contact is also maximized. As a result, the meshed tubes not only act as a sieve (filter media per se), but also provides an area to which microorganisms can attach. The resulting efficiency of removal of suspended solids and soluble organic materials is far greater than conventional filter media.

The plurality of tube stack cages 2 contain a random stack of the meshed tubes.

The aeration diffusers 4 are positioned between the tube stack cages 2 to provide air so that to-be-treated influent water moves to the tube stack cages.

The treated water overflow weir 6 is positioned above the tube stack cages 2 to discharge treated water, from which suspended solids and soluble organic materials have been removed. The suspended solid discharge weir 8 is positioned above the tube stack cages 2 to discharge detached suspended solids.

The springs 9 are coupled to the top of the tube stack cages to cause vertical movements of the tube stack cages so that suspended solids are easily detached. The suspended solid removal aeration diffusers are positioned below the meshed tubes to provide air so that suspended solids are removed from the meshed tubes.

A water treatment method using a water treatment apparatus having meshed tubes, which has the above-mentioned construction, in accordance with the present invention will now be described in detail.

Referring to FIG. 1, influent water 3 containing soluble organic materials and suspended solids is introduced by a pump or gravity in a cross-flow type. The aeration diffusers 4, which are installed between the tube stack cages 2 in the reaction tank, supply air. Thrust by the air generates rotational vortex, and the influent water is distributed to the tube stack cages 2 on both sides from the middle of the reaction tank. The water then moves from top to bottom and vice versa along channels hundreds of thousands of times. Furthermore, the fact that the aeration diffusers 4 are arranged not only along the longitudinal direction of the tube stack cages 2, but also across them guarantees more efficient water flow and perfect mixing.

The suspended solids contained in the influent water are caught by the meshed tubes while flowing along the water. Even if some suspended solids have passed through the meshed tubes, they will be caught by other tubes or the channels created in the transverse direction. The soluble organic materials are oxidized and removed by microorganisms breeding on the meshed tubes, which catch suspended solids, in the course of hundreds of thousands of contact with the tubes along the flow of water. The meshed tubes have an additional advantage as filter media in that water can flow in any direction so that, even if some part of the mesh is clogged, removal of suspended solids and soluble organic materials can proceed without interruption.

The aeration diffusers 4, which are installed in the middle of the reaction tank, evenly distribute pollutants to tube stack cages on both sides and guarantee virtually perfect hydraulic mixing. This solves the worst problem of conventional filter media of the fixed type, i.e. clogging of pores between filter media.

After suspended solids and soluble organic materials have been removed by the meshed tubes in the above-mentioned process, the resulting treated water 5 is discharged via the treated water overflow weir 6 installed on the end of the reaction tank. The suspended solid removal aeration diffusers 7, which are positioned below the tube stack cages 2, provide cleaning air and remove suspended solids caught by the tubes, sludge created by the microorganisms, etc. In this connection, the suspended solid removal aeration diffusers 7 and the middle aeration diffusers 4 may supply air at the same time. Then, the thrust of air from the middle diffusers counterbalances a part of the thrust of air from the suspended solid removal diffusers, which is directed toward the middle of the reaction tank. Consequently, the majority of suspended solids, which have been detached by the air cleaning, are discharged via the suspended solid discharge weir 8 without moving toward the middle of the reaction tank.

In this regard, conventional methods require interruption of supply of influent water to remove suspended solids from filter media by air cleaning. However, the above-mentioned arrangement of aeration diffusers 4 below the middle of the reaction tank in accordance with the present invention guarantees continuous operation without interrupting supply of influent water.

The construction of a water treatment apparatus in accordance with the present invention, which is configured to efficiently remove suspended solids and soluble organic materials from influent water, will now be described in more detail.

The apparatus includes aeration diffusers 4 configured to create thrust by aeration so that influent water 3, which is introduced by a pump or gravity and which contains suspended solids and soluble organic materials, moves to the meshed tubes; tube stack cages 2 containing meshed tubes configured to filter suspended solids and provide a surface, to which microorganisms attach and remove soluble organic materials; a treated water overflow weir 6 configured to discharge treated water, from which suspended solids and soluble organic materials have been removed; a suspended solid removal aeration diffusers 7 configured to provide air so that suspended solids are detached from the meshed tubes; springs 9 installed on top of the meshed tubes so that, every time air is supplied to detach suspended solids, the tube stack cages 2 containing meshed tubes move vertically and facilitate detachment of suspended solids; and a suspended solid discharge weir 8 configured to discharge detached suspended solids. The suspended solid discharge weir remains closed while the treated water overflow weir operates, and vice versa.

Three types of experiments are conducted to evaluate the present invention: Aeration diffusers 4 are installed in the middle of a reaction tank, which is aerated to evaluate the hydraulic mixing in the reaction tank. Inorganic particles having a particle size of about 1 μm are used as suspended solids to evaluate the removal efficiency. A mixture of inorganic particles having a particle size of at least 10 μm and soluble organic materials are used to evaluate the removal efficiency. Conventional filter media (ceramic balls, vinyl tubes, etc) and inventive filter media (meshed tubes) are used to measure the efficiency of removing the above-mentioned samples.

The experiment to evaluate hydraulic mixing is conducted in the following manner: Aeration diffusers 4 are installed in the middle of a reaction tank, and tube stack cages 2 containing meshed tubes provided with cilia are installed on both sides. As a tracer, salty water is continuously injected for a hydraulic retention time of about 20 minutes, and the change in electric conductivity of effluent water is measured as time elapses.

In the case of an experiment using suspended solids only, kaolin, inorganic microparticles having a particle size of about 1 μm, is used. When a mixture of suspended solids and soluble organic materials is used, activated sludge is used as the suspended solids, and effluent water from a secondary sedimentation basin of a sewage treatment facility is used as the soluble organic materials.

Filter media for each experiment to compare the efficiency of removal of the above-mentioned samples include conventional vinyl tubes, which have no meshed shape, meshed tubes with no cilia, and meshed tubes provided with cilia in accordance with the present invention.

Conditions for the comparative experiments are as follows: the daily processing capacity is 200 L/d; the hydraulic retention time is about 30 minutes; the filter media (vinyl tubes, meshed tubes, and meshed tubes provided with cilia alike) are cylinders having a length of about 3 cm and a caliber of 3 mm, 5 mm, 10 mm, and 15 mm, respectively.

Figure 5:
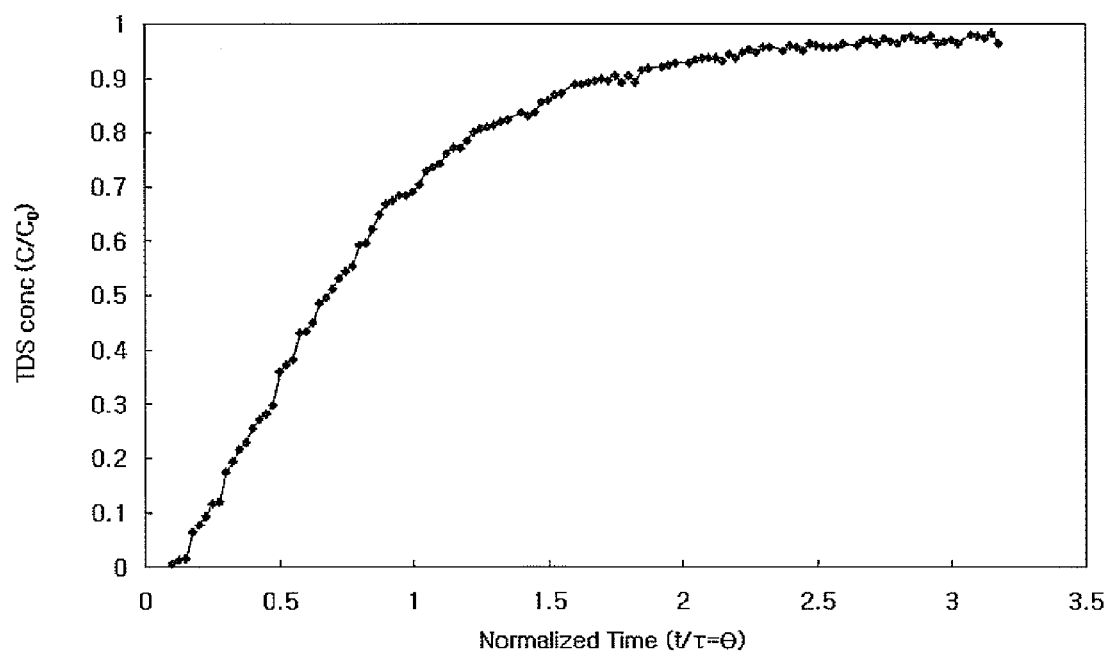
FIG. 5 is a graph illustrating result of evaluation of hydraulic mixing by inventive apparatus.

The result of evaluation of hydraulic mixing shown in FIG. 5 is obtained as follows: diffusers are installed in the middle of a reaction tank to aerate it, and both sides are filled with meshed filter media provided with cilia. Then, the ratio (C/Co) of tracer remaining in the reactor and the dimensionless retention time (t/T) are measured. It is clear from the graph that the load of suspended solids and soluble organic materials is not concentrated on the front end of the reaction tank, but is evenly distributed over the entire reaction tank, as in the case of typical perfect mixing.

TABLE 1

Result of inorganic suspended solids (kaolin) removal experiment

| Filter media | Filter media caliber (mm) | Influent S.S. Concent. (mg/L) | Concentration of suspended solids in treated water (mg/L) Time (hours) | | | | | | | | | |
|---|---|---|---|---|---|---|---|---|---|---|---|---|
| | | | 1 | 2 | 3 | 4 | 5 | 6 | 7 | 8 | 9 | 10 |
| Vinyl tube | 3 | 400 | 25 | 68 | 150 | 340 | | | | | | |
| Meshed tubes | 3 | 400 | 4 | 8 | 15 | 40 | 75 | | | | | |
| | 5 | 400 | 10 | 16 | 25 | 64 | 96 | | | | | |
| | 10 | 400 | 12 | 23 | 36 | 75 | 120 | | | | | |
| | 15 | 400 | 25 | 48 | 59 | 98 | 165 | | | | | |
| Meshed tubes with cilia | 3 | 400 | 2 | 3 | 2 | 5 | 8 | 8 | 12 | 18 | 17 | 20 |
| | 5 | 400 | 3 | 8 | 5 | 12 | 10 | 25 | 28 | 35 | 45 | 52 |
| | 10 | 400 | 8 | 12 | 18 | 23 | 32 | 35 | 45 | 62 | 58 | 71 |
| | 15 | 400 | 12 | 25 | 38 | 53 | 63 | 75 | 85 | 80 | 98 | 108 |

The result given in Table 1 is obtained by adding kaolin (microparticles having a size of 1 μm or less) as inorganic suspended solids to influent water at a concentration of 400 mg/L and measuring the concentration of effluent water for each medium as time elapses. In the case of vinyl tubes and meshed tubes, the initial result is good, but the concentration in the case of vinyl tubes increases faster than in the case of meshed tubes as time elapses until it reaches a high level. In contrast, the meshed tubes provided with cilia in accordance with the present invention result in very stable water quality and enable a long period of operation.

Such a difference is thought to originate from the following reason: The vinyl tubes have a cylinder shape with no mesh, and have no sieve function, so pores between tube media solely remove pollutants. The meshed tubes both incorporate a sieve function and have pores between tube media that remove pollutants. In the case of the meshed tubes in accordance with the present invention, the mesh acts as a sieve, and the pores between the tubes are filled with cilia. As a result, the entire reaction tank, which is filled with tubes, acts as a sieve, and is much more efficient than conventional media.

organic suspended solids (SS) and soluble organic materials (soluble biological oxygen demand or SBOD). In the case of vinyl tubes and meshed tubes, both media exhibit somewhat stable efficiency of removal of soluble organic materials (BOD). Removal of suspended solids is excellent in the initial phase, but the concentration rises as time elapses, and even becomes higher than concentration of the influent water. A similar tendency occurs in the case of ammoniacal nitrogen. Such tendencies are thought to originate from the following reason: In the case of vinyl tubes and meshed tubes, some reduction of the pores between media shortens the time of retention in the reaction tank. As a result, suspended solids accumulated by the influx are released at once, and the effluent concentration keeps rising above the influent concentration. The area of contact with the media also decreases. Similar accounts can be given in the case of ammoniacal nitrogen.

However, in the case of meshed tubes provided with cilia, filtering by both mesh and cilia leaves no suspended solids uncaught and maximizes the specific surface area so that soluble organic materials are removed very stably.

The water treatment apparatus and the water treatment method using the same in accordance with the present inven-

TABLE 2

Result of experimental treatment of polluted water containing organic suspended solids and soluble organic materials (influent water*: suspended solids (activated sludge) + water treated by sewage treatment facility)

| Filter media | Filter media caliber (mm) | Influent water* Concent. (mg/L) | Concentration of treated water (mg/L) Time (days) | | | | | | | | | |
|---|---|---|---|---|---|---|---|---|---|---|---|---|
| | | | 1 | 2 | 3 | 4 | 5 | 6 | 7 | 8 | 9 | 10 |
| Vinyl tubes | 3 | SBOD: 20 | 10 | 5 | 3 | 5 | 5 | 3 | 6 | 4 | 5 | 6 |
| | | SS: 20 | 3 | 8 | 6 | 10 | 15 | 40 | | | | |
| | | $NH_3$—N: 20 | 5 | 8 | 12 | 13 | 15 | | | | | |
| Meshed tubes | 5 | SBOD: 20 | 5 | 3 | 2 | 4 | 6 | 5 | 4 | 2 | 3 | 4 |
| | | SS: 20 | 2 | 5 | 8 | 12 | 18 | 35 | 63 | | | |
| | | $NH_3$—N: 20 | 3 | 2 | 6 | 5 | 8 | 14 | 16 | | | |
| | 10 | SBOD: 20 | 4 | 6 | 3 | 5 | 3 | 7 | 8 | 5 | 7 | 8 |
| | | SS: 20 | 2 | 8 | 12 | 24 | 38 | 57 | | | | |
| | | $NH_3$—N: 20 | 2 | 3 | 8 | 12 | 15 | | | | | |
| Meshed tubes with cilia | 5 | SBOD: 20 | 2 | 4 | 3 | 2 | 2 | 3 | 5 | 6 | 3 | 2 |
| | | SS: 20 | 1 | 2 | 3 | 2 | 1 | 3 | 2 | 2 | 3 | 1 |
| | | $NH_3$—N: 20 | 3 | 2 | 1 | 1 | 2 | 1 | 1 | 1 | 2 | 1 |
| | 10 | SBOD: 20 | 5 | 4 | 2 | 3 | 2 | 3 | 5 | 3 | 4 | 2 |
| | | SS: 20 | 2 | 3 | 5 | 2 | 2 | 4 | 3 | 2 | 2 | 1 |
| | | $NH_3$—N: 20 | 2 | 3 | 2 | 3 | 2 | 1 | 1 | 2 | 2 | 1 |

Table 2 shows the result of experimental treatment of polluted water containing a mixture of activated sludge as tion have the following advantages: the present invention employs meshed tubes, which are made of synthetic yarn and provided with cilia, as filter media. The hollow interior of the meshed tubes enables water to move in any direction, and the high porosity maximizes the area for filtering of suspended solids and attachment of microorganisms. The resulting efficiency of removal of suspended solids and soluble organic material is far greater than conventional methods. A series of diffusers are arranged in the middle of the reaction tank so that aeration by them results in perfect mixing in the reaction tank. The load of suspended solids and soluble organic materials is evenly distributed over the entire filer media. This solves the worst problem of conventional fixed filter media, i.e. clogging. If a considerable number of pores of fixed filter media are clogged by suspended solids, air cleaning is conducted to remove the suspended solids. To this end, filter media are divided into two sets so that, during cleaning, one set of media operate with the other turned off (i.e. on-off type operation). However, installation of diffusers in the middle of the reaction tank in accordance with the present invention guarantees continuous introduction and treatment even during the cleaning process.

In summary, installation of diffusers in the middle of the reaction tank, as well as between the tube stack cages, results in perfect mixing and guarantees that treatment and cleaning can proceed simultaneously without having to interrupt the operation.

While the present invention has been described with respect to the specific embodiments, it will be apparent to those skilled in the art that various changes and modifications may be made without departing from the spirit and scope of the invention as defined in the following claims.

What is claimed is:

1. A water treatment apparatus, comprising:
   a plurality of meshed tubes each having a cylinder shape made of synthetic yarn, wherein ends of the meshed tubes are unwoven and provided with cilia;
   a plurality of tube stack cages containing the meshed tubes;
   an aeration diffuser positioned between the tube stack cages and configured to provide air so that to-be-treated influent water moves upward between the tube stack cages so as to be supplied to the tube stack cages;
   a suspended solid removal aeration diffuser positioned below the meshed tubes and configured to provide air so that suspended solids are removed from the meshed tubes;
   a suspended solid discharge weir positioned above the tube stack cages and configured to discharge detached suspended solids; and
   springs coupled to the top of the tube stack cages and configured to cause vertical movements of the tube stack cages.

2. The water treatment apparatus of claim 1, wherein the meshed tubes are obtained by selecting yarn from the group consisting of polypropylene yarn, polyethylene yarn, polyvinyl alcohol yarn, and acrylic yarn, the yarns having a thickness of about 0.1 mm, weaving the yarn into an elongated cylinder, and cutting the cylinder into tubes having a length of about 5 cm.

3. The water treatment apparatus of claim 2, wherein the meshed tubes have a dimension selected from the group consisting of a caliber of 3 mm and a mesh size of 0.26 mm×0.25 mm, a caliber of 5 mm and a mesh size of 0.75 mm×0.85 mm, a caliber of 10 mm and a mesh size of 1.1 mm×1.4 mm, a caliber of 15 mm and a mesh size of 1.5 mm×1.8 mm, and a caliber of 20 mm and a mesh size of 1.8 mm×1.9 mm.

4. The water treatment apparatus of claim 1, further comprising:
   a treated water overflow weir positioned above the tube stack cages and the suspended solid discharge weir, and configured to discharge treated water, wherein suspended solids and soluble organic materials have been removed from the treated water.

* * * * *